United States Patent

Chang

[11] Patent Number: 5,513,083
[45] Date of Patent: Apr. 30, 1996

[54] ROTARY DEVICE OF A PROJECTOR

[76] Inventor: Ming C. Chang, No. 10, Alley 48, Lane 5, Sheng Li St., Yung Kang City, Taiwan

[21] Appl. No.: 421,762

[22] Filed: Apr. 14, 1995

[51] Int. Cl.⁶ .................................................. F21V 17/02
[52] U.S. Cl. ........................... 362/284; 362/323; 362/324; 362/331; 74/665 GA; 359/889; 359/891
[58] Field of Search ....................... 74/665 GA, 813 C, 74/813 L, 817, 819; 475/323, 331, 254; 362/277, 280–284, 293, 319, 322–324, 386, 455, 456, 331; 359/813, 814, 889, 891

[56] References Cited

U.S. PATENT DOCUMENTS

| | | | |
|---|---|---|---|
| 2,417,579 | 3/1947 | Young | 475/323 |
| 2,515,330 | 7/1950 | Bolsey | 359/889 |
| 2,625,851 | 1/1953 | Gelb | 359/889 |
| 3,045,208 | 7/1962 | Tiberio | 362/284 |
| 4,544,236 | 10/1985 | Endo | 359/814 |
| 5,009,488 | 4/1991 | Fay et al. | 359/889 |
| 5,402,326 | 3/1995 | Belliveau | 362/284 |

FOREIGN PATENT DOCUMENTS 30283  2/1983  Japan ........................... 359/889

Primary Examiner—Denise L. Gromada
Assistant Examiner—Alan B. Cariaso
Attorney, Agent, or Firm—Testa, Hurwitz & Thibeault

[57] ABSTRACT

A rotary device of a projector includes a plate and a board engaged by extending a shaft of a motor engaged to a side of the board through a center of the board and the plate respectively, the board having an opening defined therein and the plate having a plurality of holes defined therein, the opening and each one of the holes coinciding with each other respectively when the plate is rotated about the shaft, the plate having a main gear fixedly engaged to the shaft and four ring elements extending transversely from the plate, each ring element having an inner periphery defining the corresponding hole and having a toothed portion defined in an outer portion thereof engaged to the main gear, a first one-way stop engaged to the plate, when a torque transmitted from the motor is less than the resistant force between the first one-way stop and the plate, each of the ring elements rotates while the plate is static, otherwise, the plate is rotated about the shaft while each of the ring elements is rotated therewith.

4 Claims, 7 Drawing Sheets

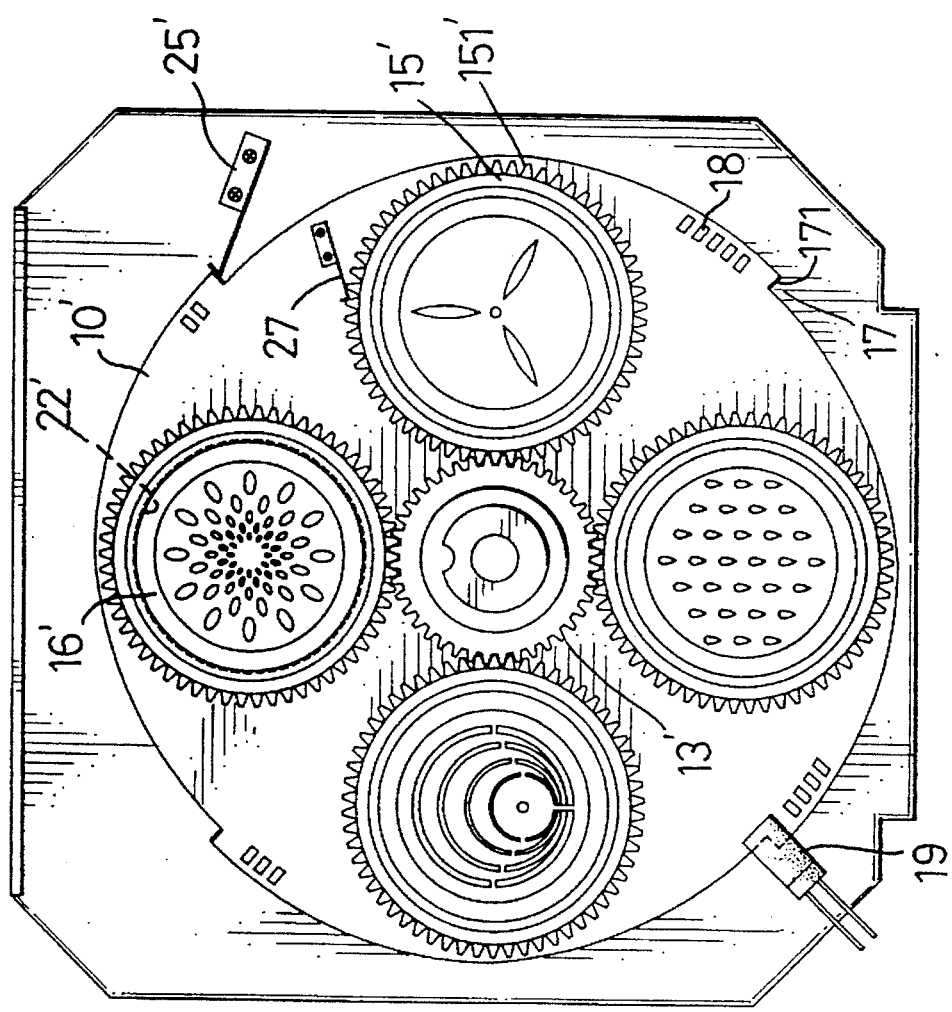

ROTARY DEVICE OF A PROJECTOR

BACKGROUND OF THE INVENTION

The present invention relates to a rotary device of a projector and more particularly, to an improved rotary device which has a plate with a plurality of pictures disposed therein and the pictures are projected in a form of rotating about an axis of the plate or rotate whilst the plate is static.

In order to achieve a better visible effect on a stage, a projector is used to project pictures onto the stage with different colors and decorative patterns, such a kind of projector has a plate rotatably engaged to a board and is driven by a motor, the plate has a plurality of holes defined therein and each hole has a picture disposed therein, the board has an opening defined therein corresponding to one of the pictures when the plate rotates. A light beam is transmitted from a light source and accordingly projects the picture corresponding to the opening to the stage via suitable lens assembly. However, the picture projected on the stage can only provide a fixed pattern which is deemed to be boring on a modern stage and cannot meet the requirements of vigorousness and multiplicity.

The present invention intends to provide an improved rotary device of a projector, wherein the pictures disposed in a rotatable plate of the device can be rotatably or fixedly projected onto a stage so as to mitigate and/or obviate the above-mentioned problems.

SUMMARY OF THE INVENTION

The present invention provides a rotary device of a projector, which includes a plate having a plurality of holes defined therein and a board having an opening defined therein, a motor having a shaft extending through both of the plate and the board and engaging to a main gear disposed to a center of the plate, a plurality of ring elements rotatably engaged to the plate and each of which having an inner periphery defining a corresponding hole within which a picture is disposed, a toothed portion defined in an outer portion of each of the ring elements and engaged to the main gear, a first one-way stop disposed to the board to allow the plate to be rotated in a single direction and a one-way drive means disposed to the board controlled to rotate the plate independently from the motor, the picture rotates while the plate is static when a torque from the motor is less than the resistant force between the first one-way stop and the plate, the plate is rotated while each of the ring elements is moved therewith when the one-way drive rotates the plate.

It is an object of the present invention to provide a rotary device of a projector, which is controlled to project picture disposed in the plate in a form of self-rotating or to project each one of the pictures in sequence.

Other objects, advantages, and novel features of the invention will become more apparent from the following detailed description when taken in conjunction with the accompanying drawings.

BRIEF DESCRIPTION OF THE DRAWINGS

FIG. 8 is a front plane view of the embodiment shown in FIG. 7 of the rotary device.

DETAILED DESCRIPTION OF THE PREFERRED EMBODIMENTS

Figure 1:
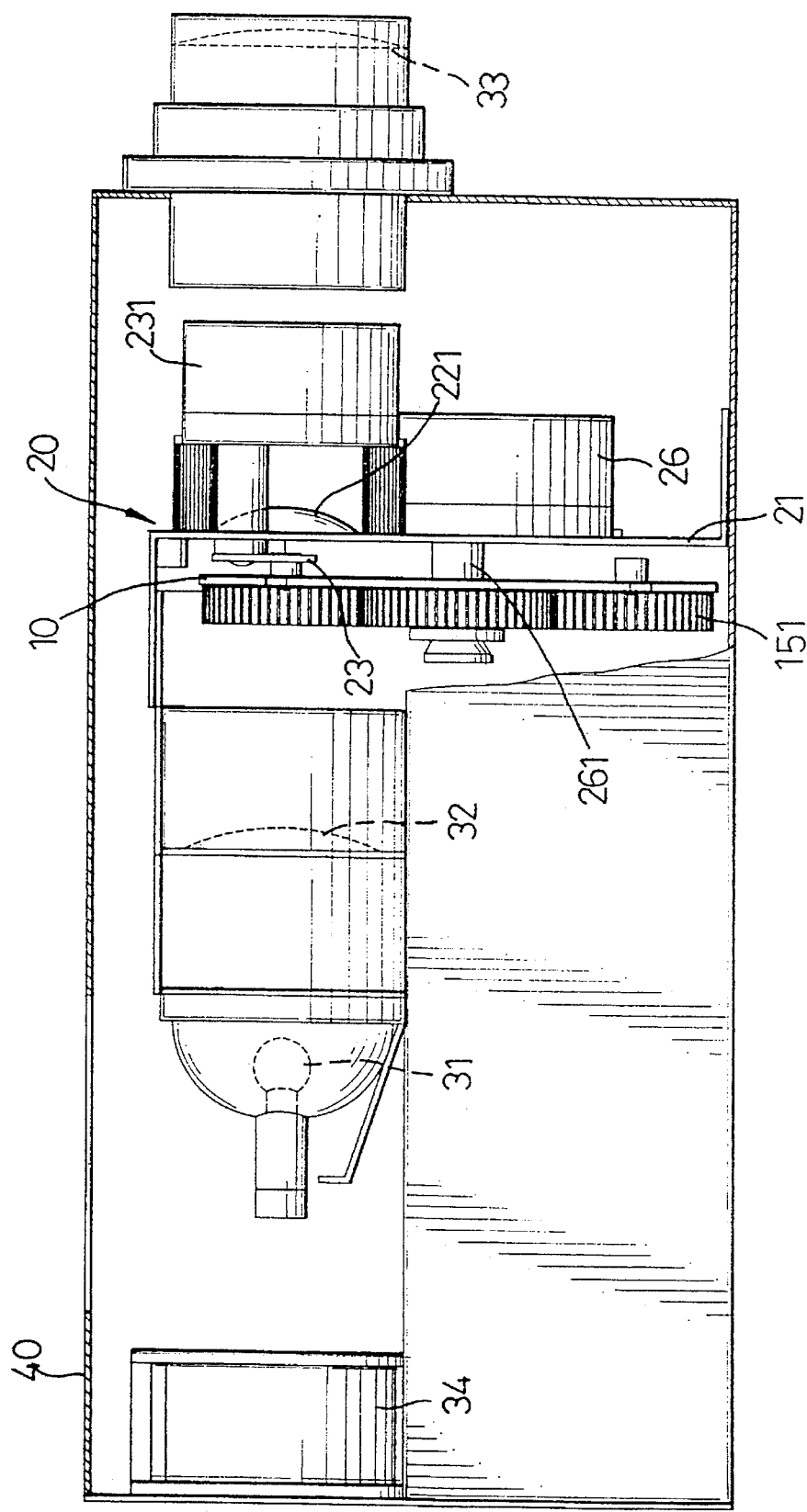
FIG. 1 is a side elevational view, partly in section, of a projector in accordance with the present invention.
Figure 2:
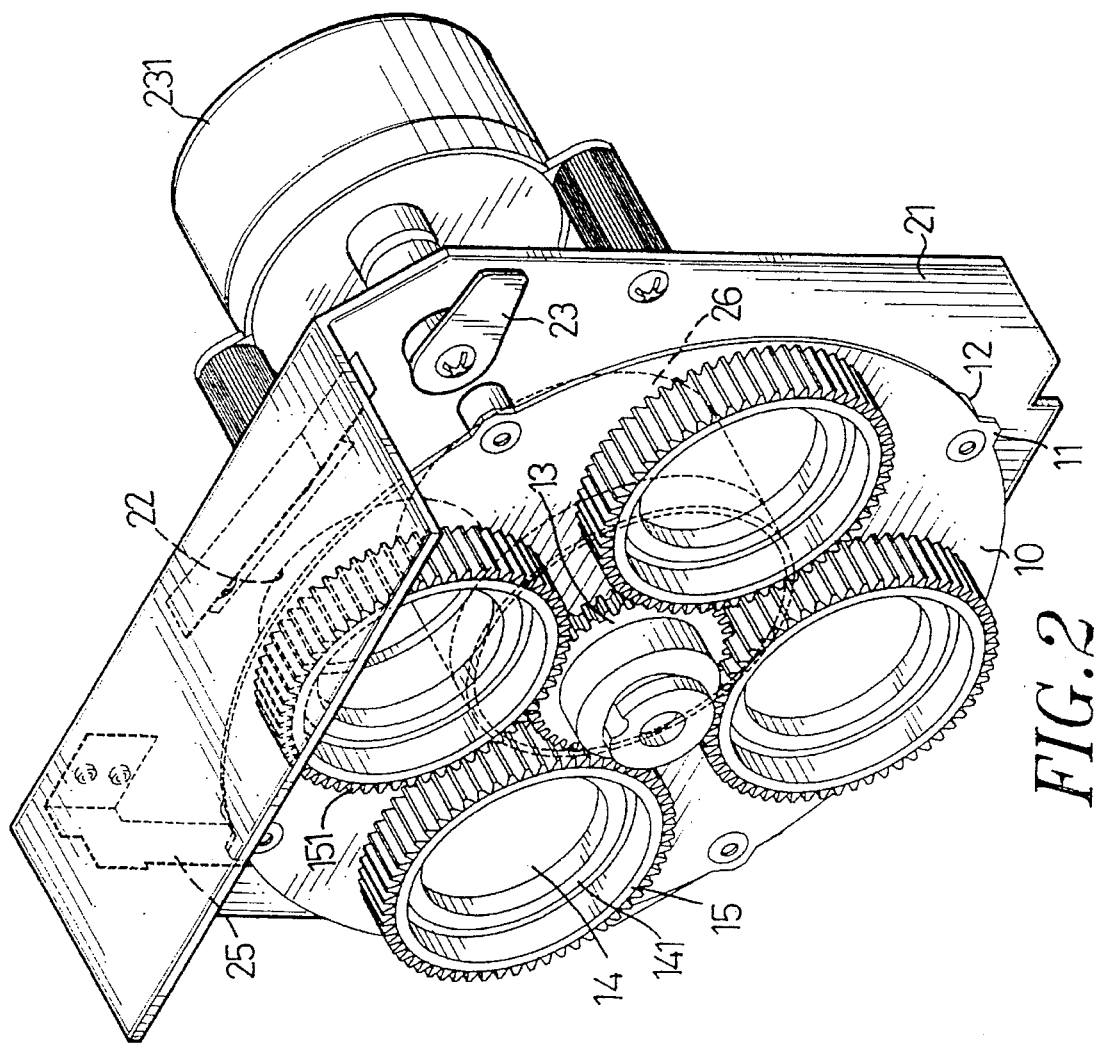
FIG. 2 is a perspective view of a rotary device in accordance with the present invention wherein a motor and an opening are shown in phantom lines.
Figure 3:
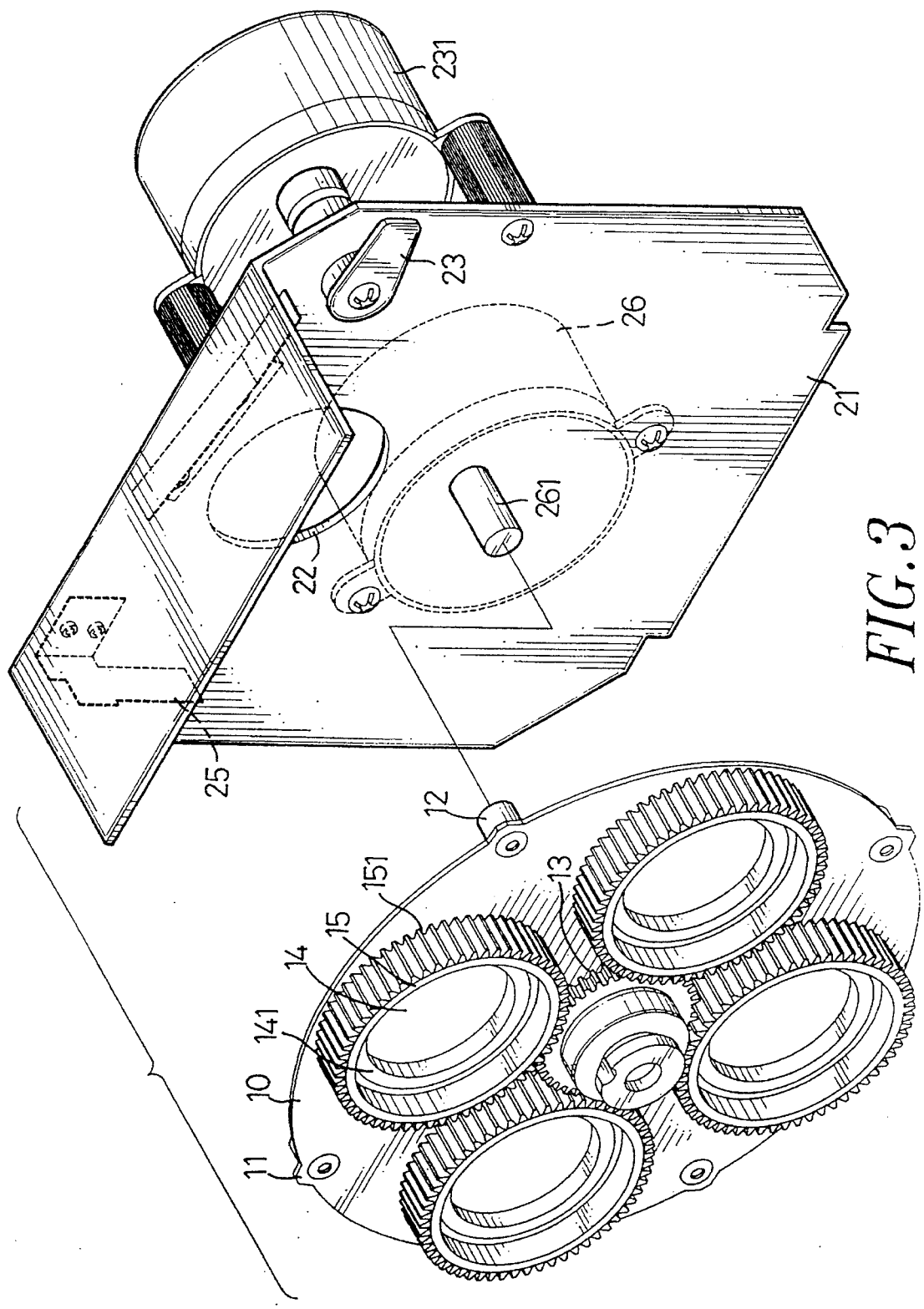
FIG. 3 is an exploded view of the rotary device in accordance with the present invention wherein the motor is shown in phantom lines.

FIG. 1 shows a projector which comprises a tube 40 having a first end and a second end, a fan 34 disposed to a first end thereof, a light source 31, a first lens 32, a rotary device 20 and a second lens 221 disposed in sequence within the tube 40 and a third lens 33 disposed to the second end of the tube 40. FIGS. 2 and 3 show the rotary device which comprises a plate 10 and a board 21, the plate 10 having a first side and a second side, the first side thereof having a main gear 13 rotatably disposed to a center thereof and four holes 14 defined in the plate 10, four tubular portions 141 extending horizontally from the first side of the plate and each having an inner periphery defining the corresponding hole 14. A ring element 15 is rotatably engaged to an outer periphery of the corresponding tubular portion 141 and has a toothed portion 151 defined in an outer periphery thereof, each toothed portion 151 is engaged to the main gear 13. Four stop arrangements 11 extend radially from a periphery of the plate 10 and a stud 12 extends from the second side of the plate 10 from a root portion of each of the four stop arrangements 11.

The board 21 has a first side and a second side and is disposed beside said plate, a motor 26 disposed to the second side of the board 21 and having a shaft 261 extending through both the plate 10 and the board 21 and fixedly engaged to the main gear 13. The board 21 has an opening 22 defined therein which coincides with the four holes respectively when the plate 10 is rotated about the shaft 261. A first one-way stop 25 being a slightly flexible plate is disposed to the first side of the board 21 and may contact against the stop arrangement 11 of the plate 10 so as to allow the plate 10 to be rotated in one direction.

A one-way drive means 231 is disposed to a second side of the board 21 and has a shaft extending through the board 21 and extending out from the first side of the board 21, a push rod 23 having an end connected to a distal end of the shaft of the one-way drive means 231.

Figure 4:
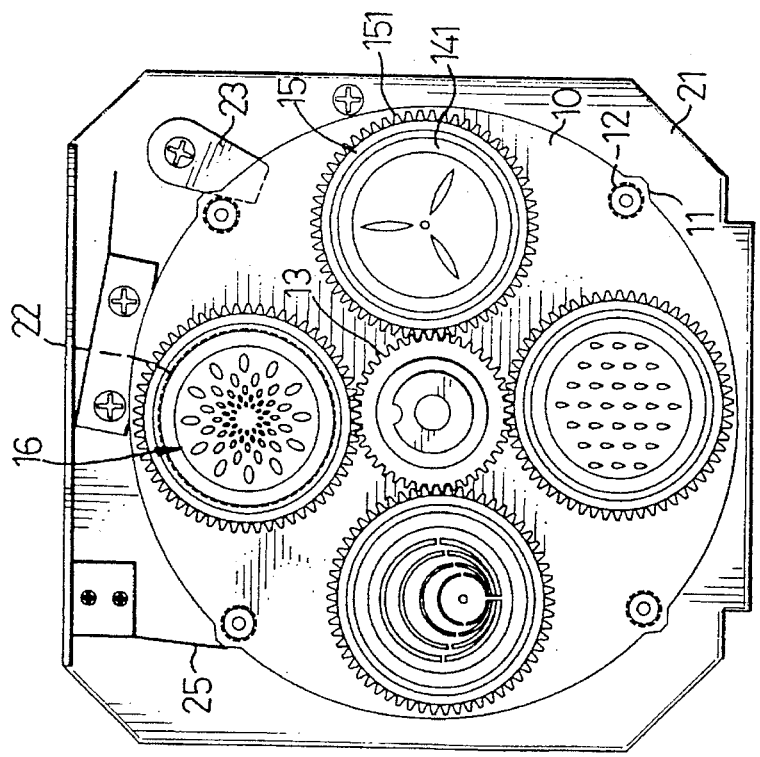
FIG. 4 is a front plane view of the rotary device wherein four pictures are disposed in the plate and one of the pictures coincides with the opening of a board.

When in use, referring to FIG. 4, a picture 16 is removably disposed within each one of the ring elements 15 and one of the stop arrangements 11 contacts against the first one-way stop 25. The motor 26 is operated and exerts a torque and intends to rotate the main gear 13 counter-clock-wise which engaged to the shaft 261 thereof, the torque from the motor 26 is controlled to be less than the resistance force between the first one-way stop 25 and the stop arrangement 11 such that the torque rotates the main gear 13, the four ring elements 15 engaged to the main gear 13 are therefore rotated and each one of the ring elements 15 performs a self-rotation action such that the picture 16 disposed therein performs a self-rotation and is projected through the opening 22 by means of the light source 31 and the lenses 32, 221 and 33.

Figure 5:
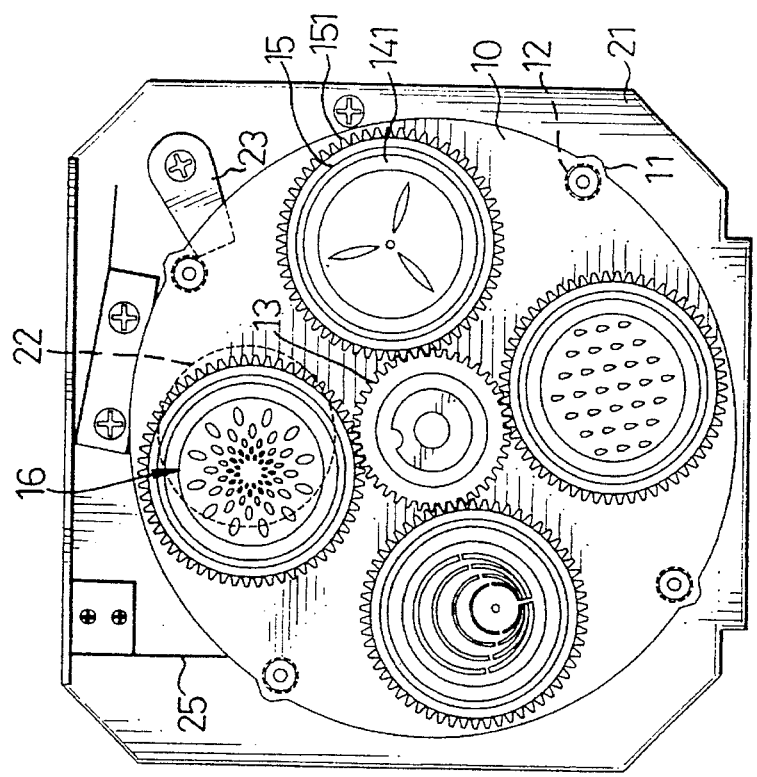
FIG. 5 is a front plane view of the rotary device wherein the plate is rotated by a push rod.

On the contrary, when the one-way drive means 231 is further operated to push the stud 12 counter-clock-wise corresponding to the center of the plate 10, the plate 10 is forced to rotate counter-clock-wise and the stop arrangement 11 moves over the first one-way stop 25 as shown in FIG. 5, under such a condition, the resistance forces created between each toothed portion 151 and the main gear 13 are larger than the torque of the motor 26 such that the ring elements 15 is rotated with the plate 10 corresponding to the shaft 261.

Figure 6:
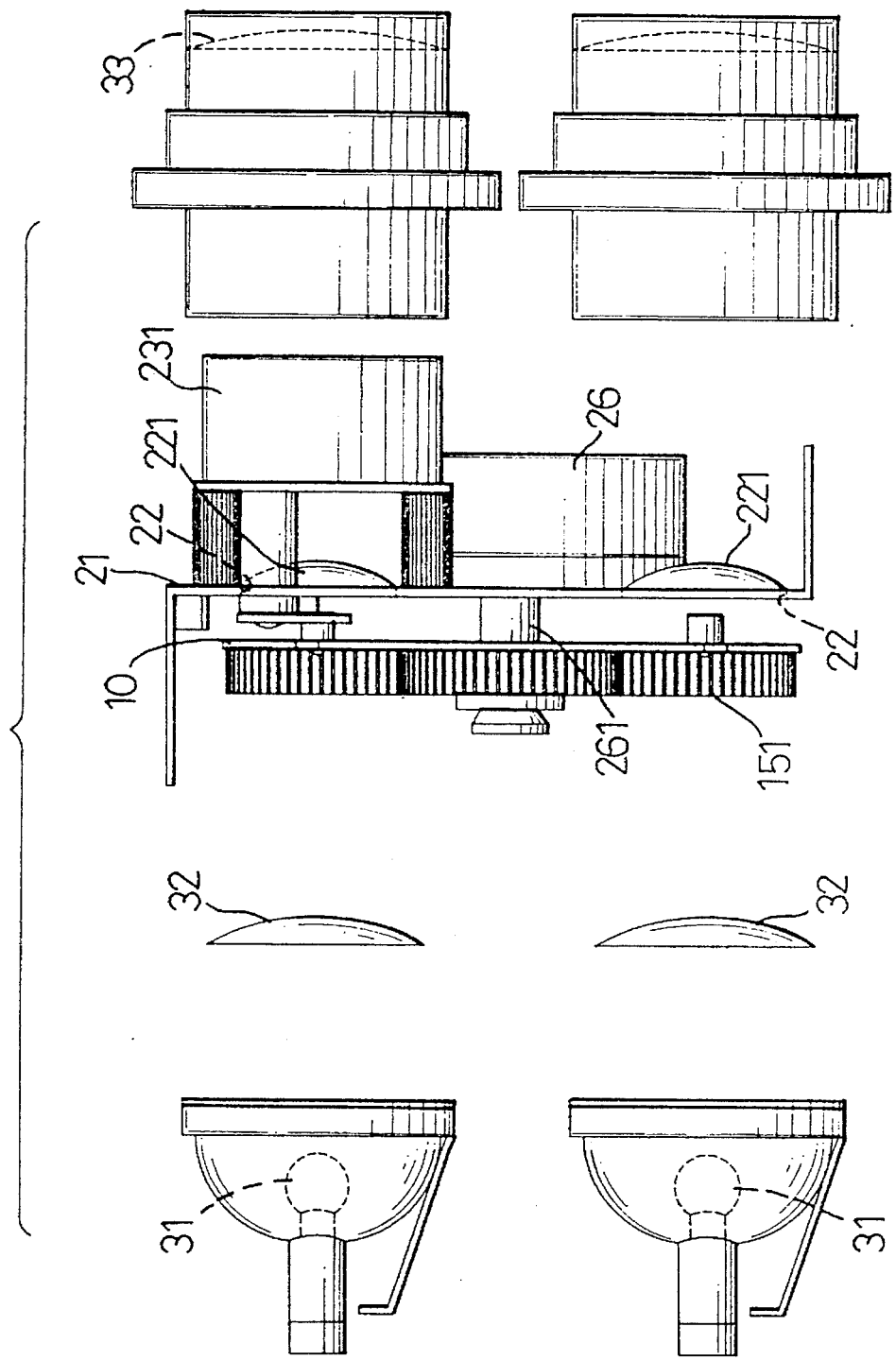
FIG. 6 is schematic view of the rotary device having two light sources and two lens assemblies.

FIG. 6 shows the rotary device having two light sources 31, two openings 22 and two sets of lenses 32, 221 and 33 such that there are two pictures 16 selectably projected simultaneously.

Figure 7:
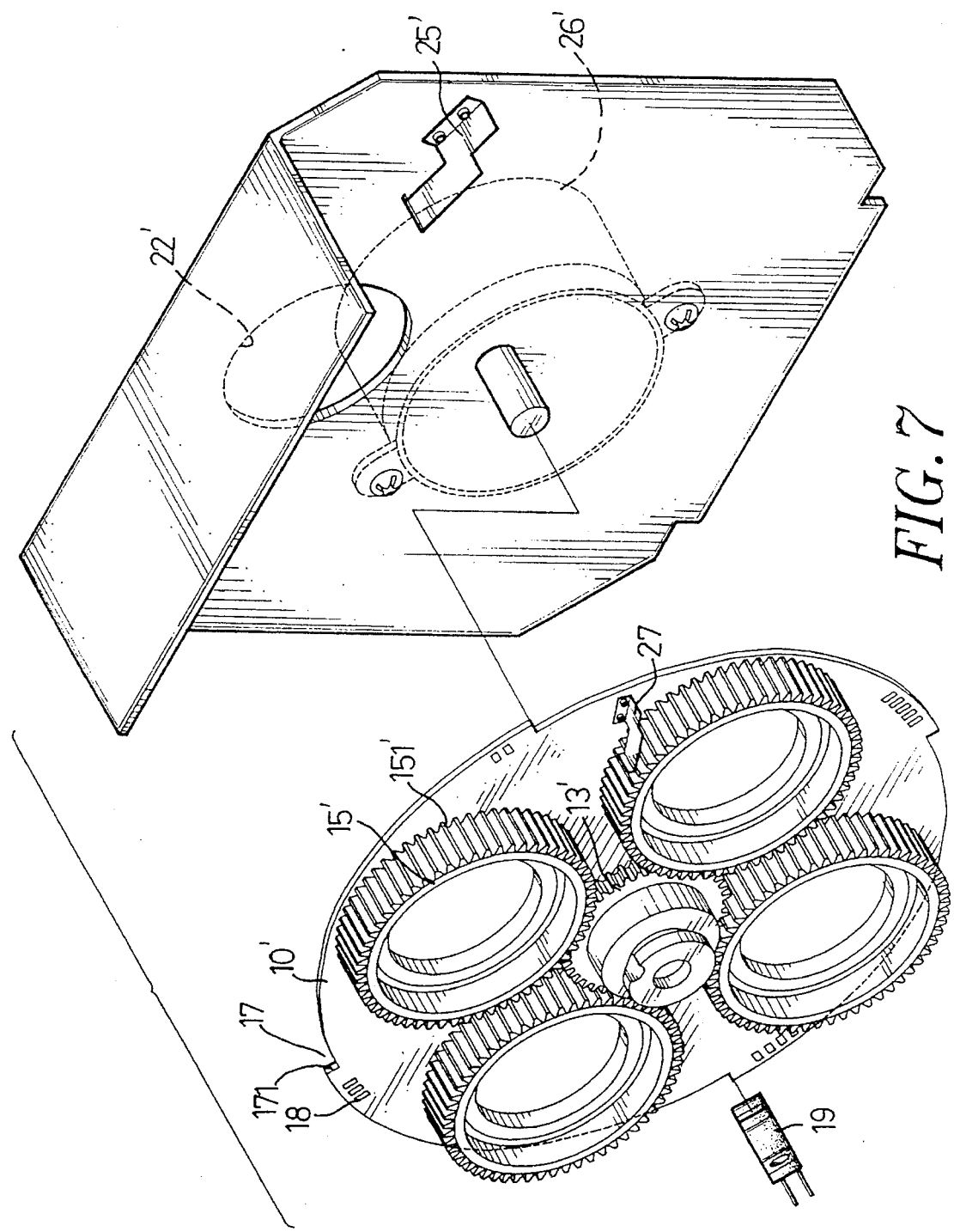
FIG. 7 is an exploded view of another embodiment of the rotary device of the present invention.

FIGS. 7 and 8 show another embodiment of the rotary device which has a similar structure as shown in FIGS. 1–6 except for the absence of the one-way drive 231, the push rod 23, four stop arrangements 11 and the four studs 12. The plate 10' has four recesses 17 defined in a periphery thereof and a shoulder portion 171 defining the corresponding recess 17 is formed, a first one-way stop 25' disposed to the plate 10' has a plate engaged to the shoulder portion 171 to prevent the plate 10' from rotating clock-wise. A second one-way stop 27 is disposed to the plate 10' and has a flexible plate engaged to the teeth portion 151' so as to prevent the ring element 15' from rotating clock-wise. The plate 10' has four groups of vents 18 defined therein, each group located near a corresponding recess 17 and each group having different numbers of vents 18. A sensor 19 for checking the numbers of the vents 18 is disposed above the plate 10' and is connected to the motor 26' to operate the motor 26' to rotate the plate 10'. When in use, the motor 26' is operated to rotate the plate 10' counter-clock-wise but when the shoulder portion 171 contacts the first one-way stop 25', the plate 10' is stopped and the main gear 13' therefore rotates the four teeth portions 151' counter-clock-wise such that the picture 16' corresponding to the opening 22' is projected in a form of self-rotation. When the plate 10' is rotated counter-clock-wise, the sensor 19 inspects a certain group of vents 18 and then the sensor 19 sends a signal to the motor 26' to rotate the plate 10' clock-wise till the first one-way stop 25' contacts the shoulder portion 171 to stop the plate 10' from rotating such that the main gear 13' is then to be operated to rotate the toothed portions 151', that is to say, the device has a feature of choosing a certain picture 16' to be projected by the sensor 19.

Accordingly, the rotary device of the present invention can be operated to project the picture rotating while the plate is static or rotating with the plate 10 corresponding to the shaft 261.

Although the invention has been explained in relation to its preferred embodiment, it is to be understood that many other possible modifications and variations can be made without departing from the spirit and scope of the invention as hereinafter claimed.

I claim:

1. A rotary device of a projector, said projector comprising a tube having a first end and a second end, a light source disposed to a first end of said tube, a first lens, a second lens disposed in the tube and a third lens disposed to the second end of the tube, said rotary device disposed in said tube and located between said first lens and said second lens;

said rotary device comprising a plate and a board, said plate having a first side and a second side, said first side thereof having a main gear rotatably disposed to a center thereof and at least two holes defined in said plate, a tubular portion extending horizontally from said first side of said plate corresponding to each of said holes and an inner periphery thereof defining each of said corresponding holes, a ring element rotatably engaged to an outer periphery of said tubular portion and having a toothed portion defined in an outer periphery thereof engaged to said main gear;

said board having a first side and a second side and disposed beside said plate, a motor disposed to said second side of said board and having a shaft extending through both said plate and said board and fixedly engaged to said main gear, said board having at least one stop arrangement formed on a periphery thereof, said board having an opening defined therein, said opening coinciding with each of said holes in sequence when said plate rotates about said shaft; and a first one-way stop disposed to said board and engaged to said stop arrangement of said plate.

2. The rotary device as claimed in claim 1 wherein a one-way drive has a shaft extending from said first side of said board, a push rod having an end connected to said shaft, said second side of said plate having at least one stud extending therefrom so as to be pushed by said push rod to rotate said plate.

3. The rotary device as claimed in claim 1 wherein said plate has a plurality of groups of vents defined in said plate, each group having different numbers of vents, a sensor disposed above said plate and connected to said motor, said sensor checking said numbers of said vents so as to operate said motor to rotate said plate.

4. The rotary device as claimed in claim 1 wherein a second one-way stop is engaged to said toothed portion of said ring element.

* * * * *